US010635064B2

(12) United States Patent
Willcox

(10) Patent No.: US 10,635,064 B2
(45) Date of Patent: Apr. 28, 2020

(54) HYSTERETIC PROCESS VARIABLE SENSOR COMPENSATION

(71) Applicant: Rosemount Inc., Chanhassen, MN (US)

(72) Inventor: Charles Ray Willcox, Chanhassen, MN (US)

(73) Assignee: ROSEMOUNT INC., Shakopee, MN (US)

( * ) Notice: Subject to any disclaimer, the term of this patent is extended or adjusted under 35 U.S.C. 154(b) by 578 days.

(21) Appl. No.: 14/319,063

(22) Filed: Jun. 30, 2014

(65) Prior Publication Data

US 2015/0378332 A1 Dec. 31, 2015

(51) Int. Cl.
*G05B 17/02* (2006.01)
*G01L 19/02* (2006.01)
*G01L 9/00* (2006.01)
*G05B 19/404* (2006.01)

(52) U.S. Cl.
CPC ............ *G05B 17/02* (2013.01); *G01L 9/0072* (2013.01); *G01L 19/02* (2013.01); *G05B 19/404* (2013.01); *G05B 2219/31126* (2013.01)

(58) Field of Classification Search
CPC ........ G05B 19/404; G05B 2219/31126; G01L 9/0072; G01L 19/02
See application file for complete search history.

(56) References Cited

U.S. PATENT DOCUMENTS

| | | | |
|---|---|---|---|
| 5,563,587 A * | 10/1996 | Harjani | H03F 3/45928 330/9 |
| 5,642,301 A | 6/1997 | Warrior et al. | |
| 5,754,452 A * | 5/1998 | Pupalaikis | G01L 19/02 700/9 |
| 6,295,875 B1 | 10/2001 | Frick et al. | |
| 6,508,129 B1 | 1/2003 | Sittler | |
| 7,334,484 B2 | 2/2008 | Harasyn et al. | |
| 8,234,927 B2 | 8/2012 | Schulte et al. | |
| 8,327,713 B2 | 12/2012 | Willcox | |
| 2001/0027677 A1* | 10/2001 | Sgourakes | G01L 27/005 73/1.57 |
| 2002/0178827 A1 | 12/2002 | Wang | |

(Continued)

FOREIGN PATENT DOCUMENTS

| | | |
|---|---|---|
| CN | 1139483 | 1/1997 |
| CN | 101858811 | 10/2010 |
| CN | 102239397 | 11/2011 |

OTHER PUBLICATIONS

"The Compensation of Hysteresis of Silicon Piezoresistive Pressure Sensor", by Chuan et al., IEEE Sensors Journal, vol. 11, No. 9, Sep. 2011.

(Continued)

*Primary Examiner* — Mischita L Henson
(74) *Attorney, Agent, or Firm* — Westman, Champlin & Koehler, P.A.

(57) ABSTRACT

A process variable transmitter for sensing a process variable of an industrial process includes a process variable sensor configured to sense a current process variable of the industrial process. Measurement circuitry is configured to compensate the sensed process variable as a function of at least one previously sensed process variable characterized by a Hysteron basis function model. Output circuitry provides a transmitter output related to the compensated sensed process variable.

29 Claims, 14 Drawing Sheets

(56) References Cited

U.S. PATENT DOCUMENTS

| | | | |
|---|---|---|---|
| 2005/0258959 A1 | 11/2005 | Schnaare et al. | |
| 2009/0210179 A1* | 8/2009 | Tang | H01M 10/48 702/63 |
| 2012/0179403 A1* | 7/2012 | Griffith | G05B 17/02 702/65 |
| 2014/0375237 A1* | 12/2014 | Wang | H02P 7/00 318/400.15 |

OTHER PUBLICATIONS

Notification of Transmittal of the International Search Report and the Written Opinion of the International Searching Authority from PCT/US2015/025081, dated Jul. 1, 2015.
Office Action from Chinese Patent Application No. CN201420642877. 6, dated Dec. 10, 2014.
Office Action from Chinese Patent Application No. 201410602426. 4, dated Mar. 14, 2017.
Communication from European Patent Application No. 15721384. 4, dated Feb. 7, 2017.
Office Action from Canadian Patent Application No. 2,953,800, dated Jul. 24, 2017.
Office Action from Chinese Patent Application No. 201410602426. 4, dated Nov. 1, 2017.
Office Action from Japanese Patent Application No. 2017-520871, dated Feb. 20, 2018.
Office Action from Canadian Patent Application No. 2,953,800, dated Mar. 26, 2018.
Office Action from Canadian Patent Application No. 2,953,800, dated Oct. 30, 2018.
Office Action from Japanese Patent Application No. 2017-520871, dated Nov. 13, 2018.
Office Action from Canadian Patent Application No. 2,953,800, dated Jul. 24, 2019.
"Mathematical Models of Hysteresis" by I.D. Mayergoyz, The American Physical Society, Vo. 56, No. 15, Apr. 14, 1986, pp. 1518-1521.
"Hysteresis Compensation in Electromagnetic Actuators Through Preisach Model Inversion", by S. Mittal et al., IEEE, vol. 5, No. 4, Dec. 2000, pp. 394-409.
Examination Report from Indian Patent Application No. 201627041056, dated Apr. 24, 2019.
Communication from European Patent Application No. 15721384. 4, dated Feb. 27, 2020.

\* cited by examiner

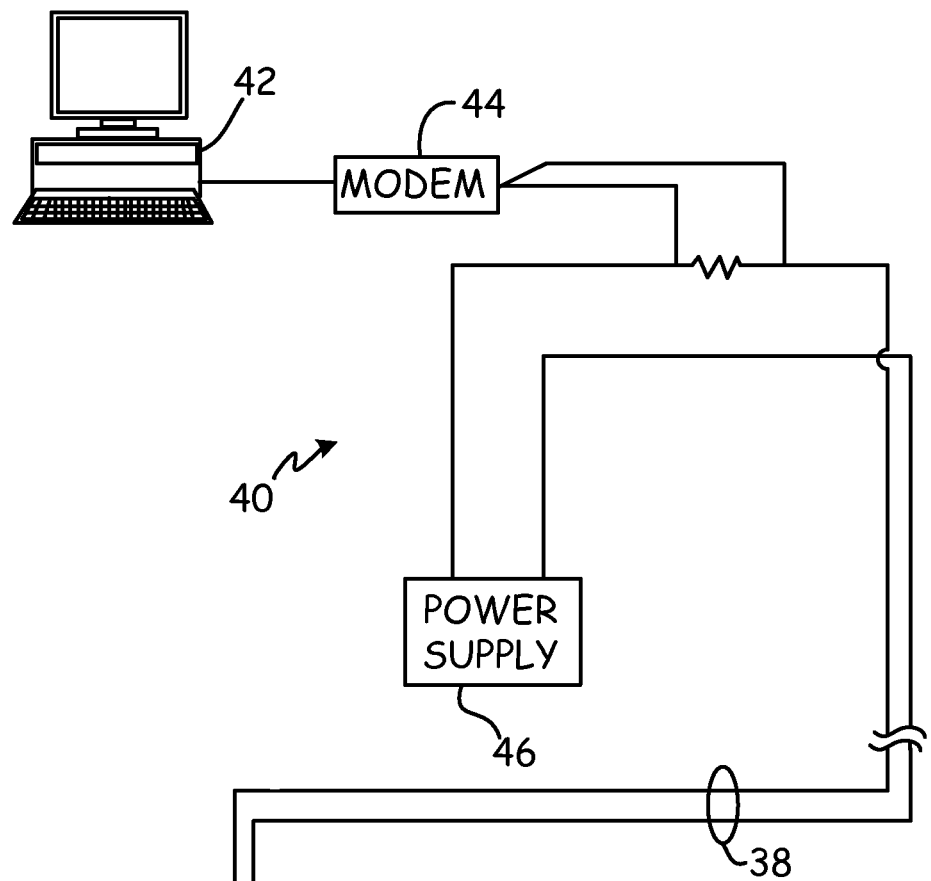
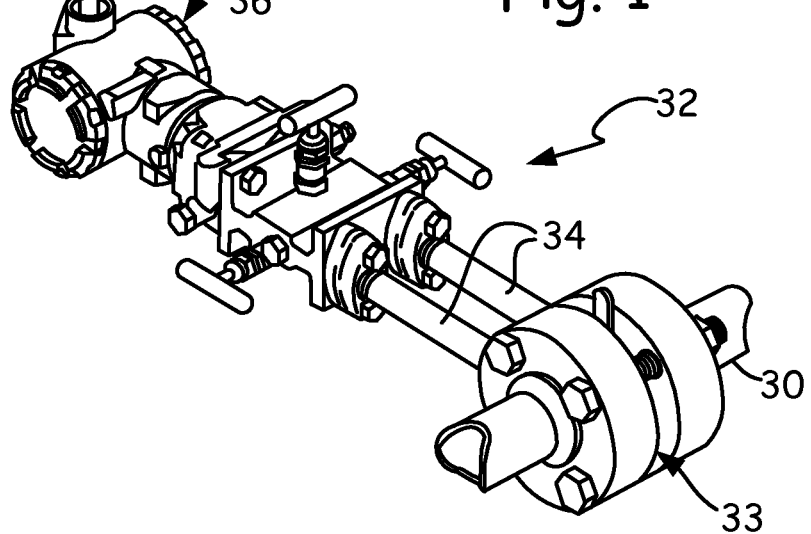
Fig. 1

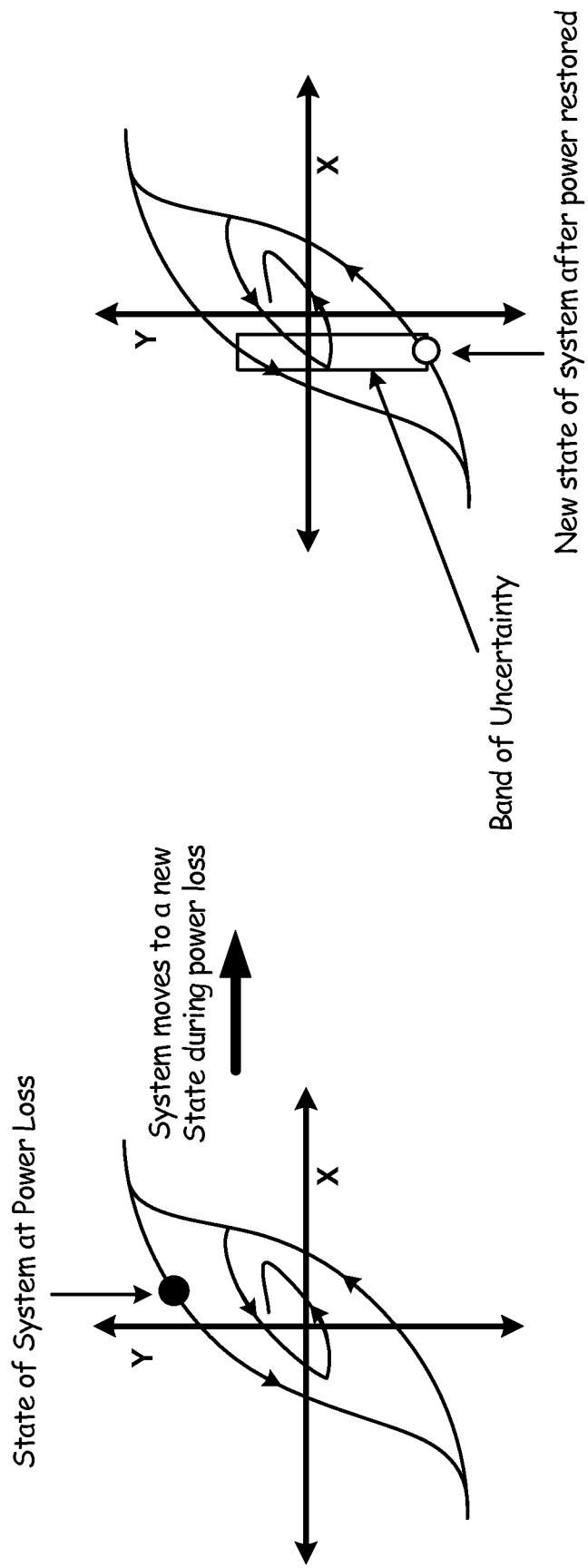

US 10,635,064 B2

HYSTERETIC PROCESS VARIABLE SENSOR COMPENSATION

BACKGROUND

The present invention relates to process variable transmitters of the type used in industrial process control and monitoring systems. More specifically, the present invention relates to compensation of a sensor output in a process variable transmitter using a Hysteron basis function.

Industrial process control and monitoring systems typically use devices known as process variable transmitters to sense various process variables. For example, processes can be used in the manufacture, processing, transportation and storage of various process fluids. Example process variables which are monitored include temperature, pressure, flow rate, level within a container, and pH, among others. These process variables are sensed using a process variable sensor of the process variable transmitter. In a typical configuration, the process variable transmitter transmits information related to the sensed process variable to another location, such as a central control room.

In order to monitor operation of the process with certainty, it is important that a particular process variable be accurately sensed. One type of error which can arise in sensing a process variable is related to an effect known as hysteresis. This hysteresis effect can cause the output from a process variable sensor to have more than one possible state for a particular value of a process variable being sensed. Thus, the hysteresis effect can lead to inaccurate measurement of a process variable. One technique to address this hysteresis effect is to design process variable sensors which exhibit reduced hysteresis. However, it may not be possible to completely eliminate the hysteresis effect or such a design may compromise other aspects of the process variable sensor.

SUMMARY

A process variable transmitter for sensing a process variable of an industrial process includes a process variable sensor configured to sense a current process variable of the industrial process. Measurement circuitry is configured to compensate the sensed current process variable as a function of at least one previously sensed process variable characterized using a Hysteron basis function model. Output circuitry provides a transmitter output related to the compensated sensed process variable.

BRIEF DESCRIPTION OF THE DRAWINGS

FIG. 1 shows a process measurement system with a process transmitter constructed in accordance with the present invention.

FIGS. 14 and 15 are graphs illustrating the effect of a power loss and the resultant band of uncertainty in a system which exhibits hysteresis.

DETAILED DESCRIPTION OF ILLUSTRATIVE EMBODIMENTS

Figure 2:
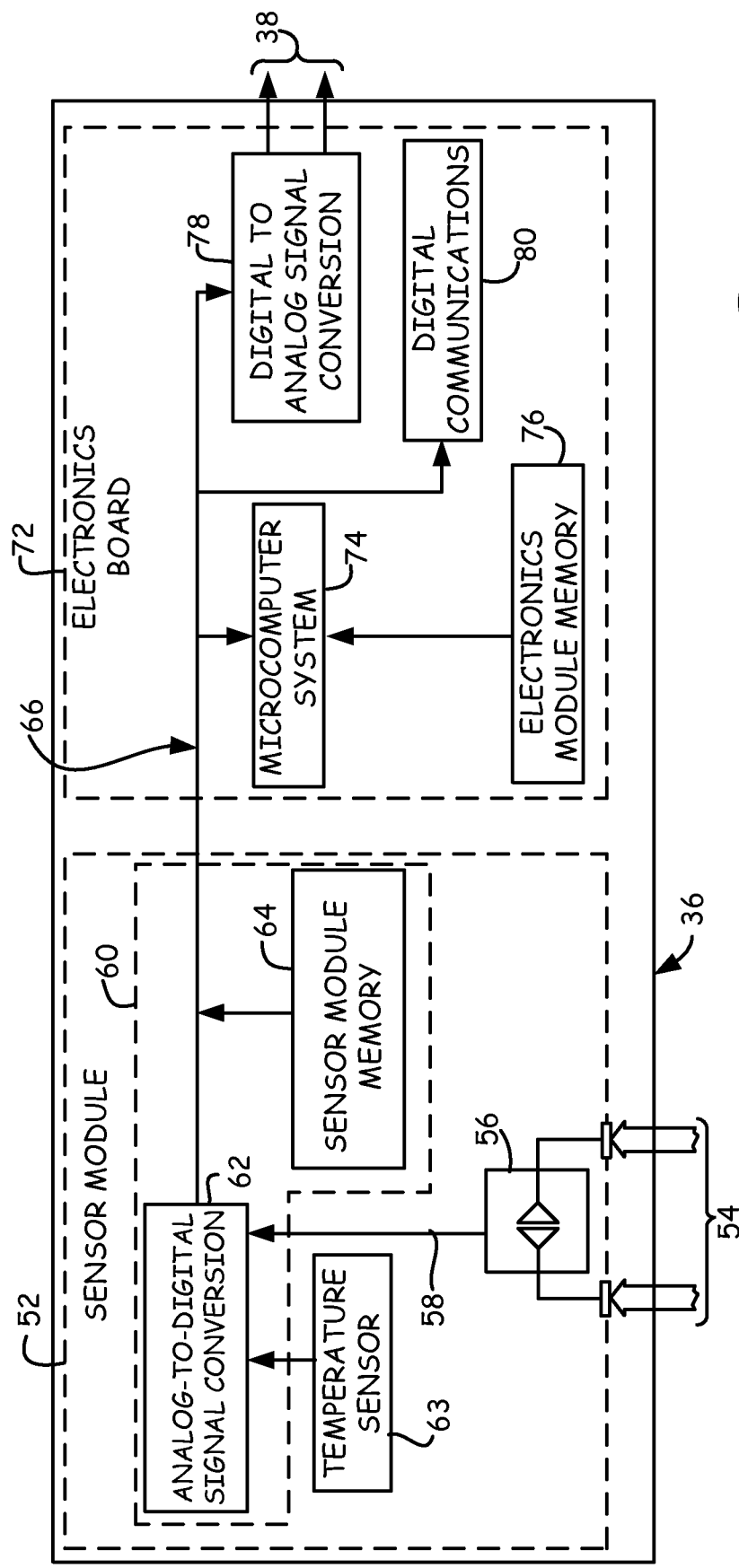
FIG. 2 is a schematic view of a transmitter of FIG. 1.

In various aspects, a method and apparatus are provided for compensating or correcting errors in process variable measurements due to hysteresis. In one specific example embodiment, the method and apparatus are implemented in a process variable transmitter of the type used to measure a process variable in an industrial process. The technique can also be used more generally to compensate process variables.

In the following discussion, a process variable transmitter configured to measure flow based upon a differential pressure is described. However, this is but one example embodiment and the invention is not limited to such a configuration. FIG. 1 illustrates generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. In the configuration of FIG. 1, the impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change (differential) in the fluid as it passes past the primary element 33 which can be related to flow of process fluid.

Transmitter 36 is an example of a process measurement device that receives process pressures through the impulse piping 34. The transmitter 36 senses a differential process pressure and converts it to a standardized transmission signal that is a function of the process pressure.

A process control loop 38 provides both a power signal to the transmitter 36 from control room 40 and bidirectional communication, and operate in accordance with a number of process communication protocols. In the illustrated example, the process control loop 38 is a two-wire loop. The two-wire loop is used to transmit all power to and all communications to and from the transmitter 36 with a 4-20 mA signal during normal operations. A computer 42 or other information handling system through modem 44, or other network interface, is used for communication with the transmitter 36. A remote voltage power supply 46 powers the transmitter 36. Process control loop 38 can be in accordance with any communication standard including the HART® communication protocol in which digital information is modulated on to a 4-20 mA current, the Foundation Fieldbus or Profibus communication protocols, etc. Process control loop 18 may also be implemented using wireless communication techniques. One example of wireless communication technique is the WirelessHART® communication protocol in accordance with IEC 62591

FIG. 2 is a simplified block diagram of pressure transmitter 36. Pressure transmitter 36 includes a sensor module 52 and an electronics board 72 coupled together through a databus 66. Sensor module 32 electronics 60 couples to pressure sensor 56 which received an applied differential pressure 54. The data connection 58 couples sensor 56 to an analog to digital converter 62. An optional temperature sensor 63 is also illustrated along with sensor module memory 64. The electronics board 72 includes a microcomputer system 74, electronics memory module 76, digital to analog signal conversion 78 and digital communication block 80. In one example configuration, in accordance with techniques set forth in U.S. Pat. No. 6,295,875 to Frick et al., pressure transmitter 36 senses differential pressure. However, the present invention is not limited to such a configuration.

Figure 3:
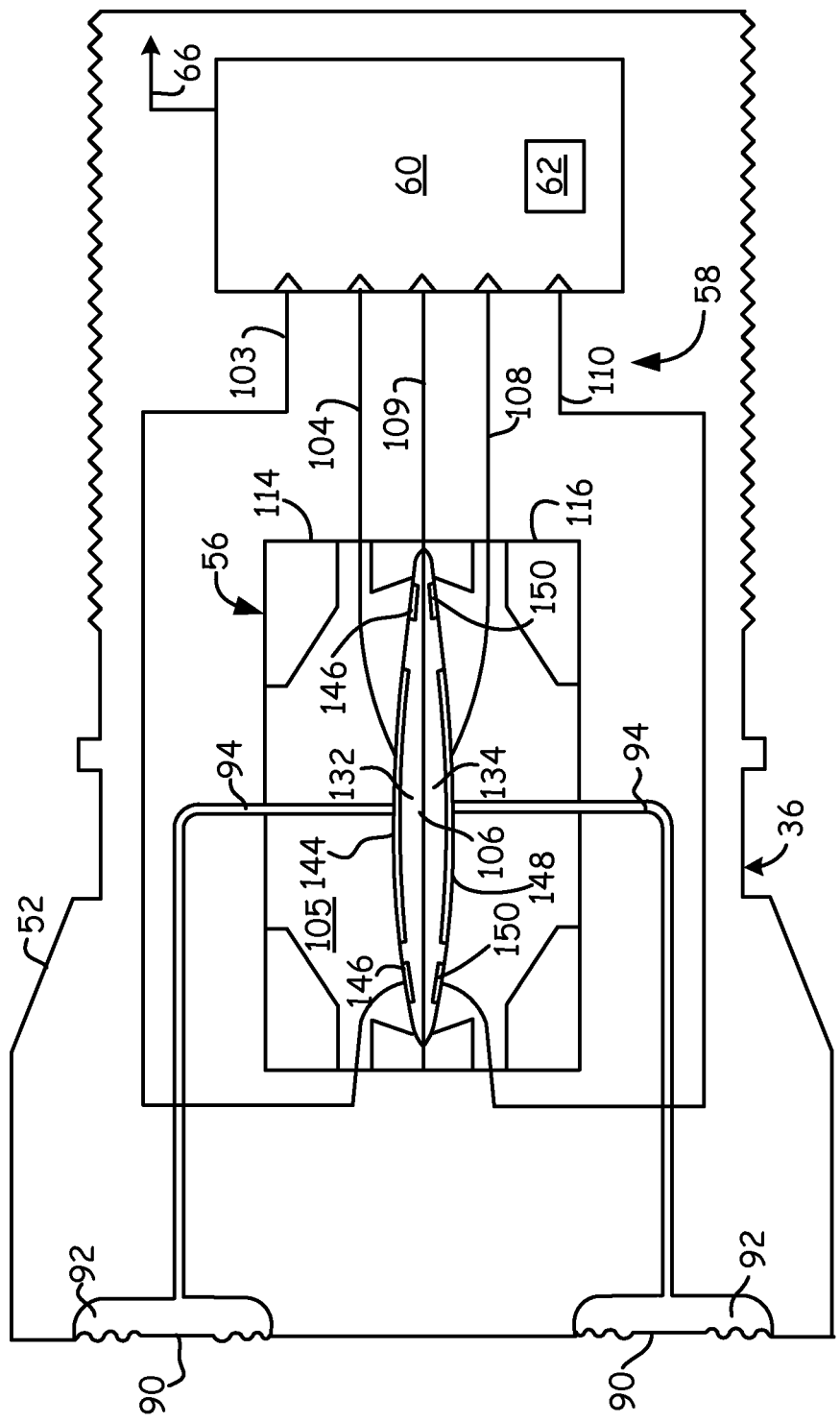
FIG. 3 shows a cross sectional view of a portion of the process transmitter of FIG. 1.

FIG. 3 is a simplified cross-sectional view of one embodiment of a sensor module 52 showing pressure sensor 56. Pressure sensor 56 couples to a process fluid through isolation diaphragms 90 which isolate the process fluid from cavities 92. Cavities 92 couple to the pressure sensor module 56 through impulse piping 94. A substantially incompressible fill fluid fills cavities 92 and impulse piping 94. When a pressure from the process fluid is applied to diaphragms 90, it is transferred to the pressure sensor 56.

Pressure sensor 56 is formed from two pressure sensor halves 114 and 116 and filled with a preferably brittle, substantially incompressible material 105. A diaphragm 106 is suspended within a cavity 132,134 formed within the sensor 56. An outer wall of the cavity 132, 134 carries electrodes 146,144,148 and 150. These can, generally, be referred to as primary electrodes 144 and 148, and secondary or secondary electrodes 146 and 150. These electrodes form capacitors with respect to the moveable diaphragm 106. The capacitors, again, can be referred to as primary and secondary capacitors.

As illustrated in FIG. 3, the various electrodes in sensor 56 are coupled to analog to digital converter 62 over electrical connections 103, 104, 108 and 110. Additionally, the deflectable diaphragm 106 couples to analog to digital converter 62 through connection 109. As discussed in U.S. Pat. No. 6,295,875, the differential pressure applied to the sensor 56 can be measured using the electrodes 144-150.

As explained in the Background section, errors can arise in process variable measurements due to a hysteresis effect. The hysteresis effect can arise from a number of sources. In general, it leads to a condition in which an output from a process variable sensor may be at two or more different states for a given applied process variable. For example, in the case of a pressure sensor, the output of the pressure sensor as a function of the applied pressure may follow one curve as the pressure is increasing and follow a different curve as the pressure is decreasing. In a specific example, metal diaphragm based pressure sensors may have a limitation in that they do not tend to act as perfect elastic materials. One manifestation of this non-ideal property is hysteresis. It is not always possible to completely eliminate hysteresis effects, for example, with a free edge diaphragm configuration. Hysteresis is history-dependent by its nature and may remain uncorrectable using traditional polynomial curve fitting techniques.

As discussed below, a method and apparatus are provided to correct for hysteresis in sensed process variables. Although metal diaphragm based sensors are discussed herein, the invention is not necessarily limited to metal diaphragm sensors and is applicable to a broad class of sensors or systems which exhibit hysteresis.

Figure 4:
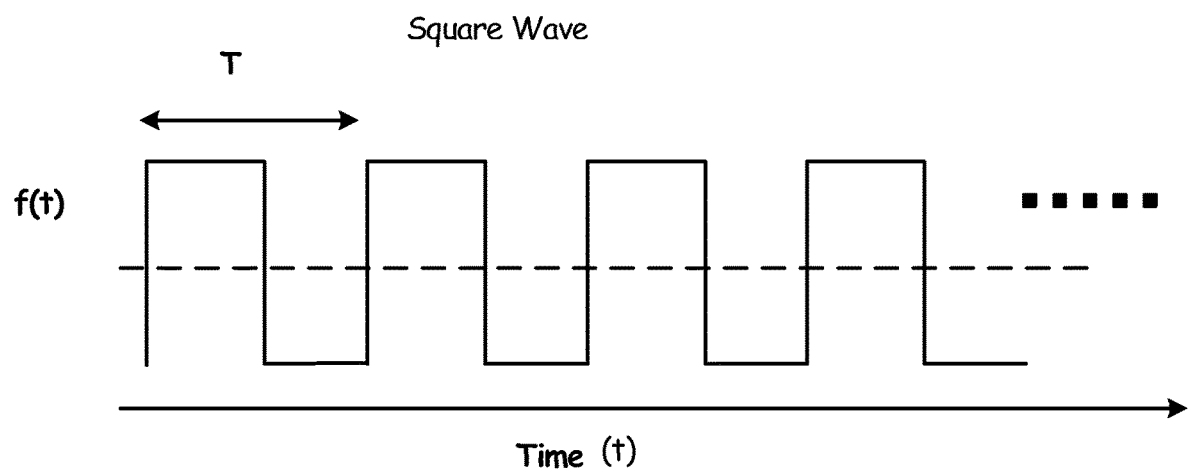
FIG. 4 is a graph of a square wave amplitude versus time.

Before introducing the hysteresis basis function, which is often referred to as a Hysteron, it is useful to review other classes of basis functions. Consider the Fourier decomposition of a "time stationary" waveform, such as the square wave shown in FIG. 4. Odd-order Sine functions can be used to characterize the waveform f(t), of FIG. 4 as:

$$f(t) \equiv \frac{4}{\pi}\left(\sum_{n=1,3,5,\ldots}\left[\frac{1}{n}\sin\left(\frac{n\pi t}{T}\right)\right]\right) \qquad \text{EQ. 1}$$

where, the basis functions are Sine functions. For generic Fourier decomposition, both Sines and Cosines are typically used.

Polynomials can also be considered to be another type of basis function and are commonly used to characterize the outputs of process variable sensors such as pressure sensors. A typical formulation is in the form of:

$$f(t) \equiv \sum_{l=1}^{N} a_1 \cdot x^l \qquad \text{EQ. 2}$$

In Equation 2, the $a_i$ coefficients are selected to characterize the output f(t) based on powers of the input variable x. In this case, the powers of x represent the set of basis functions.

Hysterons are another example of a basis function. Consider a non-ideal hysteretic relay with threshold values $\alpha$ and $\beta$ shown in FIG. 5. This simple function can serve as a basis function when characterizing functions which exhibit hysteretic behavior. The output of the relay can take one of two values [0 and 1]. At any moment, the relay is either "switched off" or "switched on".

Figure 5:
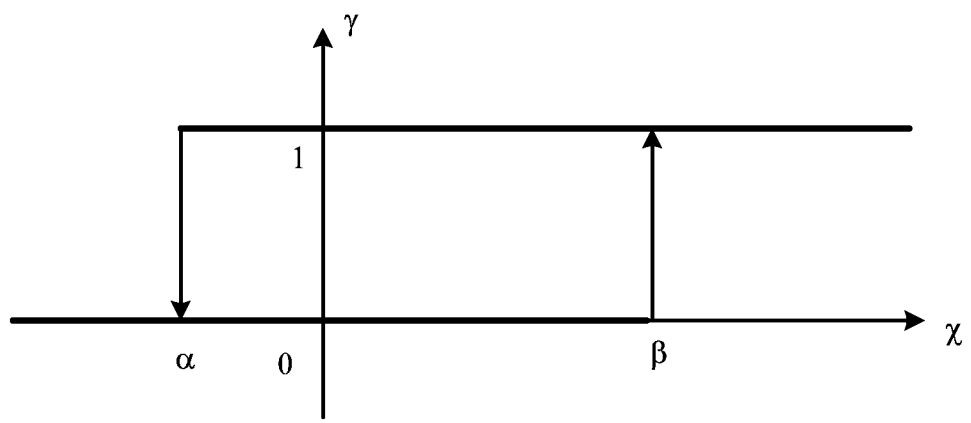
FIG. 5 is a graph illustrating operation of a hysteretic relay with threshold values $\alpha$ and $\beta$.

In FIG. 5, the bold lines represent the set of possible input-outputs pairs. If the input to the relay (x) begins at a low value (far left in FIG. 5) and is increased, the relay output will remain at zero until $x=\beta$. after which, the relay output toggles to a "1" state. The output remains at the "1" state as x continues to increase. If x is then reduced, the relay will not toggle back to "0" until $x=\alpha$, after which it remains in the "0" state for all decreasing values of x. The two threshold values $\alpha$ and $\beta$ serve to characterize the hysteretic behavior of the Hysteron.

Figure 6:
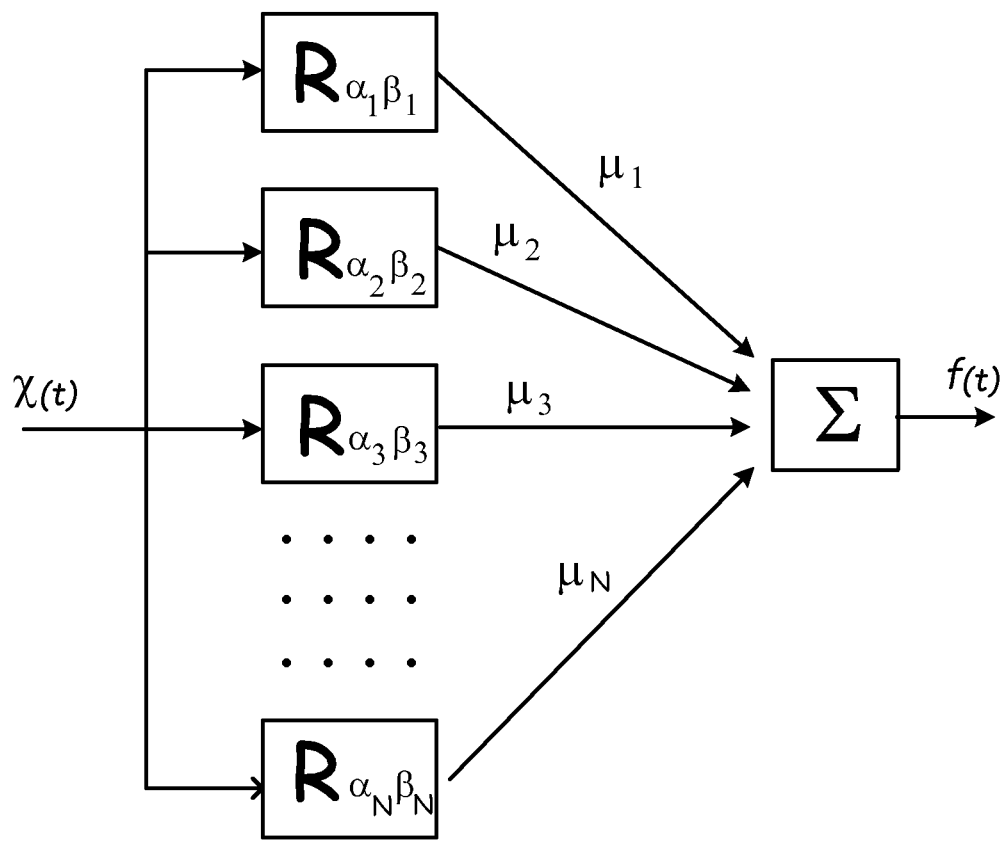
FIG. 6 illustrates a parallel connection of N hysteretic relays.

Next consider a parallel connection of N such relays $R_{\alpha\beta}$, each with thresholds $\alpha$ and $\beta$ and weight $\mu_i$ as illustrated in FIG. 6. In the N-Hysteron model, x is a common input to all N Hysterons (relays) whose weighted sum forms an output f. This model, in the discrete case, is referred to as a Discrete Preisach model.

Functions having hysteresis can be modeled very accurately using Hysteron basis functions with a fidelity controlled by the number (N) of relays (Hysterons) as well as by the degree of interpolation to be discussed later.

In order to represent any function, the thresholds $\alpha$ and $\beta$ and weights $\mu_i$ belonging to each $R_{\alpha\beta}$ need to be identified. For a given hysteretic function, the identification of thresholds and weights is accomplished through a characterization procedure, which involves: taking input and output data sufficient to describe the function's hysteresis behavior; and using an inversion procedure to identify the thresholds and weights for each of the Hysterons.

Figure 7:
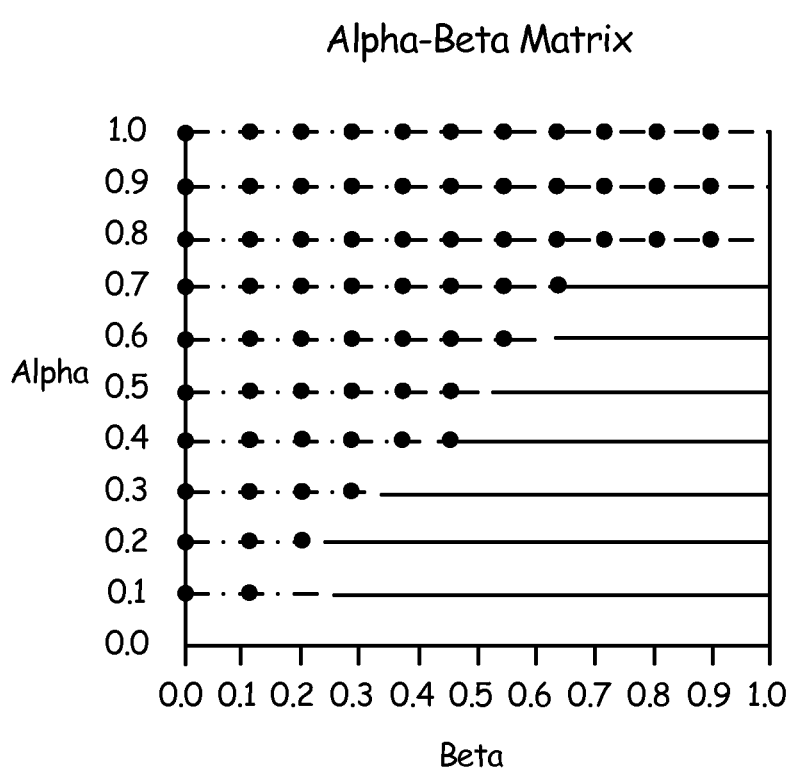
FIG. 7 is a grid illustrating a pattern of $\alpha$ and $\beta$ thresholds for a hysteretic function.

To properly characterize a given hysteretic function, a sufficient number of "up" and "down" cycles must be implemented to create a set of function outputs at each grid point in a pre-determined triangular grid pattern of "up" ($\alpha$) and "down" ($\beta$) thresholds. An example grid using 11 Hysterons is shown in FIG. 7.

The outputs of the function f(t) are labeled by $f_{a,b}$ at each grid point and stored for use in subsequent calculations. If we let $a_k$ ($b_k$) be the up (down) index value at time sample k, then the modeled output f(t) at time t, where k=n, is calculated using the following equation:

$$f(t) \equiv \sum_{k=1}^{n-1} [f_{a_k,b_k} - f_{a_k,b_{k-1}}] + f_{x(t),x(t)} - f_{x(t),b_{n-1}} \qquad \text{EQ. 3}$$

which is valid when the input x(t) is increasing. Note when x(t) is increasing, x(t) is actually $a_n$, that is, it's the current index at time k=n.

Similarly, when the input is decreasing:

$$f(t) \equiv \sum_{k=1}^{n-1} [f_{a_k,b_k} - f_{a_k,b_{k-1}}] + f_{a_n,x(t)} - f_{x(t),b_{n-1}} \qquad \text{EQ. 4}$$

For the case when x(t) is decreasing, x(t) is now $b_n$, that is, it's the current index at time k=n. It's important to note that the sum term within the square bracket is updated at each new sampled step and consequently uses only one memory location. Hence, the entire sum does not have to be recalculated at each time step. In the above formulation, the values of the weights $\mu_i$ are integrated into the magnitude of $f_{a,b}$ and the thresholds are now the index values of the $f_{a,b}$ functions. It can be demonstrated mathematically that the computation of f(t) is identical to the summation of the N Hysteron outputs as in the discrete Preisach model. The above formulation requires roughly ($N^2$)/2 memory locations to store the $f_{a,b}$ values at each (a, b) grid point. When the input does not lie on a grid point, the value of $f_{a,b}$ can be estimated by interpolation.

Figure 8:
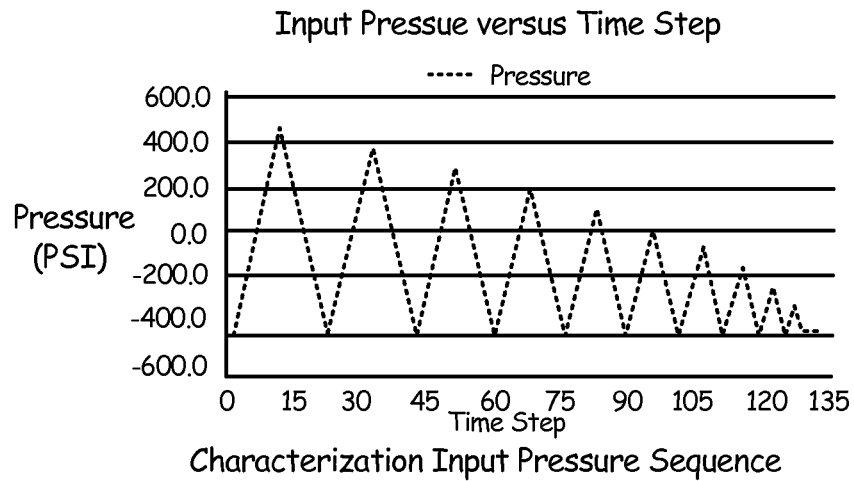
FIG. 8 is a graph illustrating a characterization input pressure profile versus time.
Figure 9:
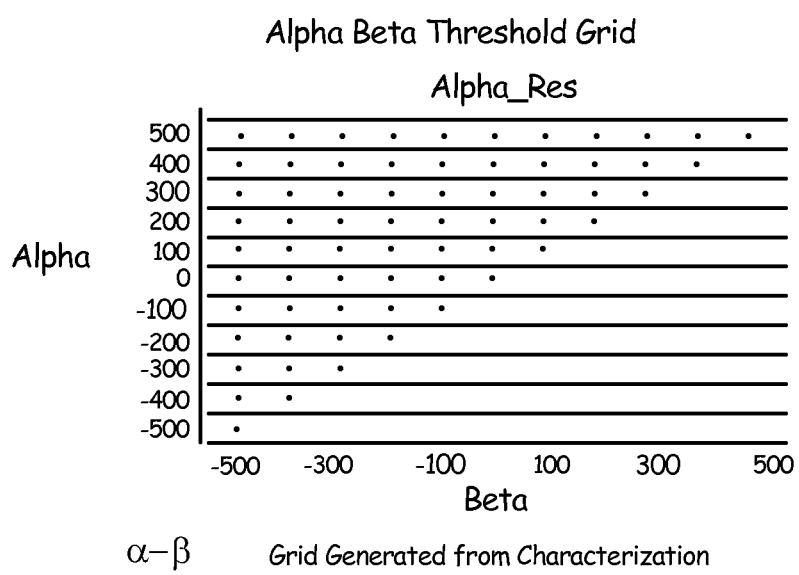
FIG. 9 is an $\alpha/\beta$ threshold grid for the function of FIG. 8.

By way of an example, the hysteresis behavior of a pressure transmitter can be modeled. FIG. 8 is a plot of the characterization input pressure profile needed to populate the $\alpha$-$\beta$ grid illustrated in FIG. 9. As the input pressure is cycled up and down, it traces out the pressure loop shown in FIG. 8. The transmitter output is being driven beyond its upper range limit and consequently saturates for inputs greater than 300 psi.

Figure 10:
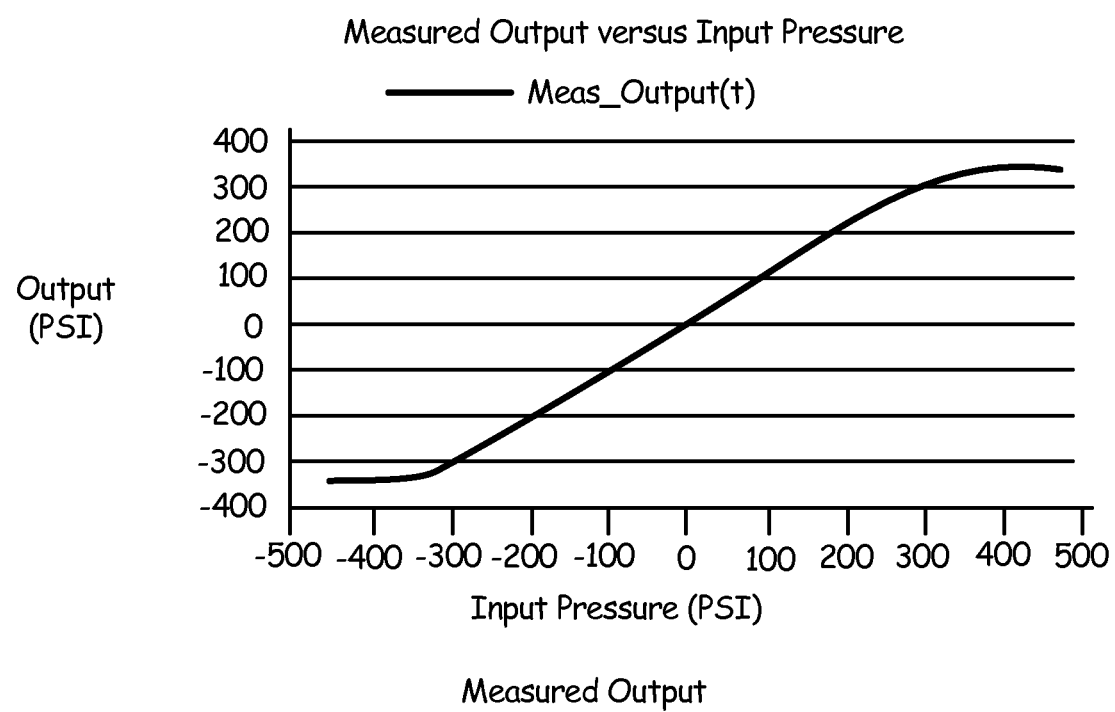
FIG. 10 is a graph of sensor output versus input pressure.
Figure 11:
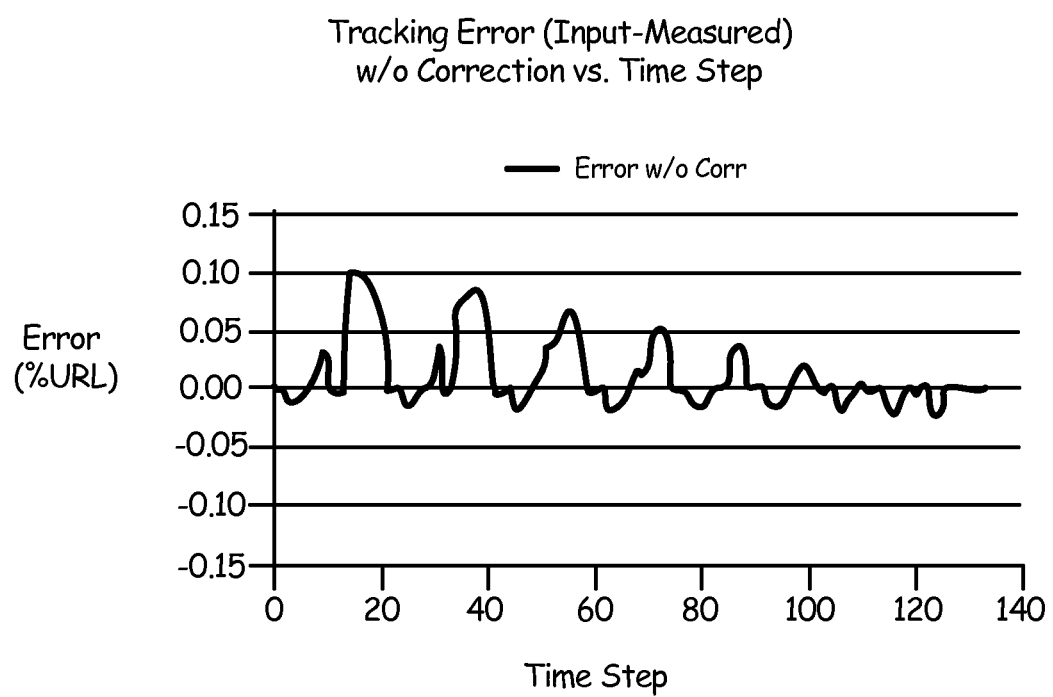
FIG. 11 is a graph illustrating the percent error versus time of a sensor output that has hysteresis.

FIG. 10 is an illustration of the output from a process variable pressure sensor versus the applied input pressure. Note that the output pressure hysteresis behavior is relatively small and difficult to observe at the scale of FIG. 10. However, the hysteresis can be revealed by subtracting the input from the output pressure values as illustrated in FIG. 11. This shows that the hysteresis errors generated by the input profile are as high as 0.1% of the upper range limit of the sensor.

Figure 12:
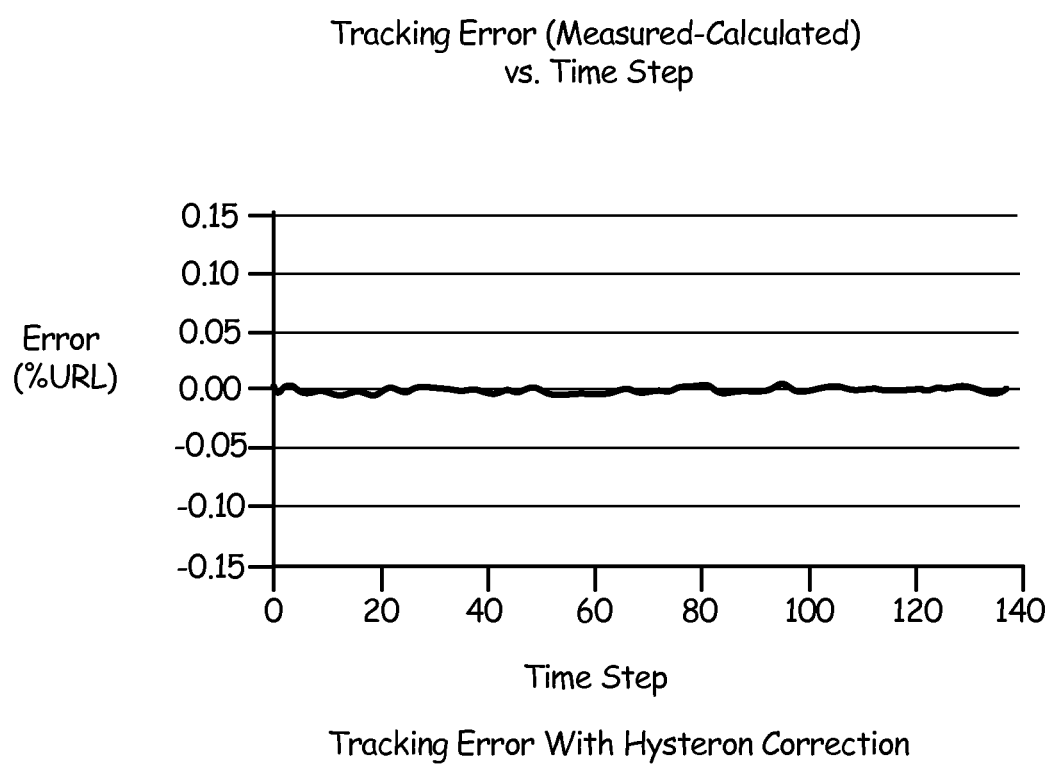
FIG. 12 is a graph of percent error versus time after error correction using a Hysteron basis function model.

If a 10 Hysteron model is used to correct the above output, the errors are significantly reduced as can be seen in FIG. 12. Comparing this with the chart shown in FIG. 11, it can be seen that there is almost a twenty times reduction in the errors when using the Hysteron model. These results show that, contrary to conventional wisdom, hysteresis, if repeatable, is in fact a correctible phenomenon using Hysteron basis functions.

Figure 13:
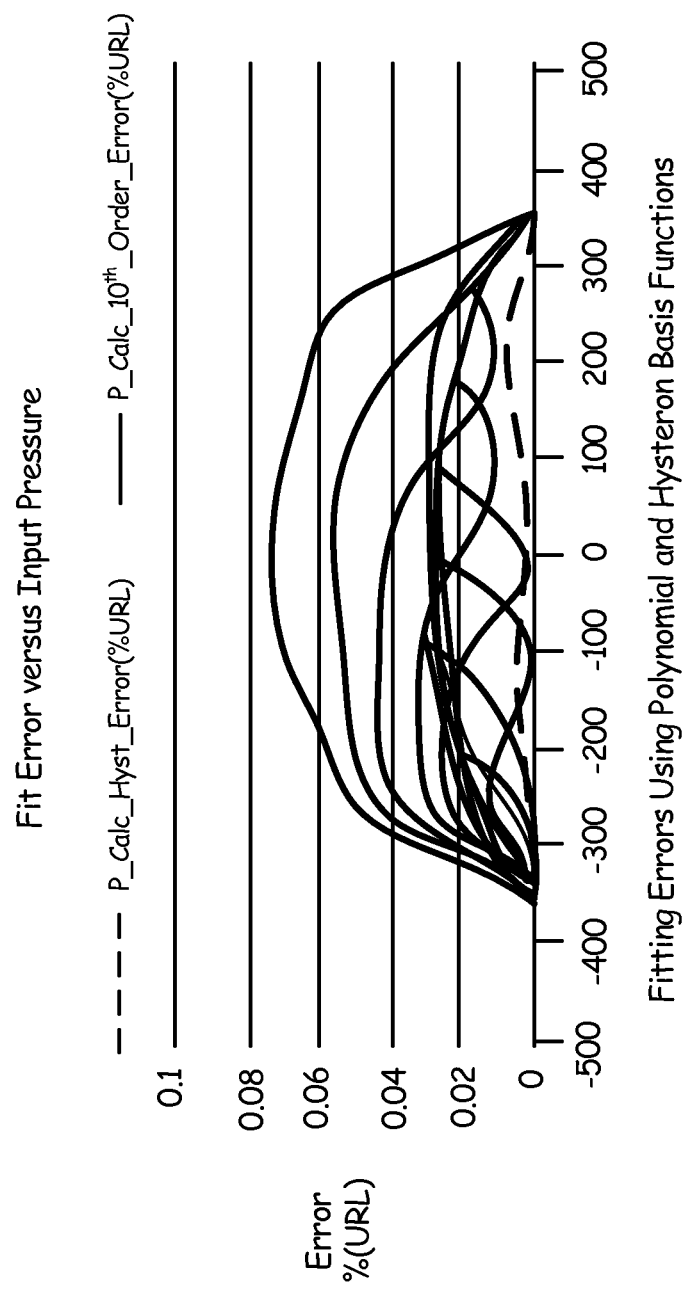
FIG. 13 is a graph illustrating the characterized output percent errors versus input pressure using both polynomial and Hysteron basis functions.

In addition to correcting errors in sensor measurements due to hysteresis, the Hysteron basis function model can also be used as an alternative to polynomial based compensation techniques. It is useful to compare the fitting errors when a Hysteron model is used to those when a polynomial basis function is used. FIG. 13 is a plot of the fitting errors from a pressure sensor fit with both a 10-Hysteron model and a polynomial model. The dashed line is the Hysteron model and displays significantly lower errors than the polynomial fit. In fact, the Hysteron model will always have errors equal to or less than the best possible polynomial fit. Hence, Hysterons are a viable alternative to the standard polynomial fitting method used today in many pressure transmitters. Unlike polynomials, Hysterons are better able to fit the sensor output during periods of output saturation, as this is a natural state for them to assume. Hysteron basis functions are therefore useful even if hysteresis is not a concern.

The above discussion is directed to correction or compensation of the output from pressure sensors due to characteristics of the sensor itself. However, there may be other sources of hysteresis in a measurement system which can lead to such errors. For example as illustrated in FIGS. 2-3, some pressure sensors couple to a process pressure across an isolation diaphragm. In such a configuration, a process fluid is applied to one side of the isolation diaphragm. The diaphragm deflects based upon the applied pressure. This deflection is transferred to a fill fluid on the other side of the isolation diaphragm. The pressure sensor is then coupled directly to the fill fluid. Some isolation diaphragms, such a metal isolation diaphragms, may exhibit a hysteresis effect which will negatively impact process variable sensor measurements. The output f(t) formulation as discussed above can still be used to correct for hysteresis once it has been characterized. In all cases, the magnitude of the remaining hysteresis error will depend on the number of Hysterons used, the selection of characterization points to populate the grid, as well as the quality of the interpolation.

In the above discussion, a Hysteron basis function formulation is used for curve-fitting, or to correct for the hysteresis of a sensor (e.g., pressure sensor, temperature sensor, etc.). However, a loss of fidelity may temporarily occur whenever power is lost and the system is subsequently physically exercised. Physical changes which occur while the system is powered down can potentially create hysteresis that will not be correctly accounted for by the Hysterons once power is restored. This is because the Hysterons do not "know" the system was perturbed while powered down. The same problem occurs at initial power-up and therefore a procedure needs to be identified to deal with an uninitialized state.

Figure 16:
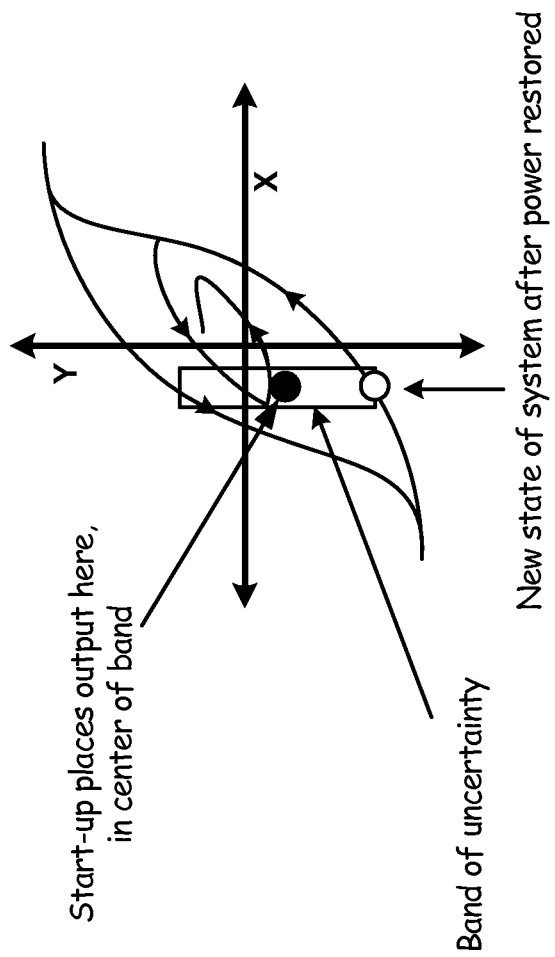
FIG. 16 is a graph illustrating the hysteresis function of FIGS. 14 and 15 including an initial system state upon restoration of power.

The technique described below can re-establish the states of the Hysterons, either at initial power-up, or following a power-loss. FIGS. 14 and 15 depict a situation that might occur in the event of a power loss. In FIG. 14, the system is at the state depicted by the solid dot. After loss of power, the system continues to be physically exercised bringing it to the state indicated by the circle in FIG. 15, at which time power was restored. At power-up, because of hysteresis, there is a wide band of uncertainty where the output could lie given an input value (x). One procedure to address this situation is a follows: First, force the computed output (y) to be located at the center of the hysteresis band. This is possible because during characterization, the up and down output extremums (outer loops) are known for every value of input (x). The result is depicted in FIG. 16.

Mathematically, the initialized output value $y(t_{start})$ at a given input value $x(t_{start})$ is set according to:

$$y(t_{start}) \equiv \frac{(f_{x(t_{start}),x(t_{start})} + f_{a_{\text{Max}},x(t_{start})})}{2} \qquad \text{EQ. 7}$$

where, the functions $f_{a,b}$ are known from the characterization step (discussed above) and $f_{x(tstart),x(tstart)}$ and $f_{aMax,x(tstart)}$ are specifically the lower (up-going) and upper (down-going) loop extremums respectively at x(tstart), and $a_M$, is the maximum value for the $a_k$ index.

Because the output error is initially centered, the fidelity error at initialization is at a maximum. Subsequent errors will be reduced as the system input continues to change. The rate of error reduction will be tied to the "wiping-out" property of the Hysteron memory states. This property can be explained mathematically as follows: In practice, the wiping-out process happens whenever the up and down input changes exceed the current value. The size of the error reduction will scale with the magnitude of the input change. An analogy is the "de-Gaussing" process carried out on Ferromagnetic materials. In this procedure, the input de-Gaussing field starts out very large and is gradually reduced. The large field "wipes-out" any magnetic memory in the Ferromagnet. The same mechanism operates in the Hysteron model. Hence, by starting the system at the middle of the error band, the error and bias of the system are minimized to reduce all subsequent errors as quickly as possible. The characterization information used to initialize the hysteresis correction process following a power up may be stored in a permanent or semi-permanent memory, for example, memory 64 or 76 shown in FIG. 2. In general, this technique allows the system to reset the states of the Hysterons upon power restoration after power is lost in a device.

Although the present invention has been described with reference to preferred embodiments, workers skilled in the art will recognize that changes may be made in form and detail without departing from the spirit and scope of the invention. Although the specific examples discussed above relate to a pressure sensor, the invention is applicable to any type of process variable sensor including, but not limited to, those which sense temperature, level, flow, pH, turbidity, among others. Further, the techniques are applicable to other types of sensing technologies and are not limited to those specifically discussed herein. As used herein, the term "compensate", includes both error correction as well as curve fitting, or characterization of a sensor output. The hysteresis that can be corrected includes hysteresis generated within the process variable sensor, as well as hysteresis which arises from components external to the process variable sensor. As discussed above, an isolation diaphragm may introduce such hysteresis. Another source of hysteresis which may arise externally to a process variable sensor includes an isolation bellows.

What is claimed is:

1. A process variable transmitter for sensing a process variable of an industrial process, comprising:
   a process variable sensor configured to sense a current process variable of the industrial process;
   measurement circuitry configured to compensate the sensed current process variable as a function of at least one previously sensed process characterized using Hysteron basis functions; and
   output circuitry configured to provide a process variable transmitter output related to the compensated sensed process variable;
   wherein the Hysteron basis functions are each set to initial values that are between hysteresis loop extremes upon power up.

2. The process variable transmitter of claim 1 wherein the Hysteron basis function is implemented in an N-Hysteron model, where N is the number of Hysterons.

3. The process variable transmitter of claim 2 wherein the N-Hysteron model comprises a plurality of Hysterons with configurable $\alpha$ and $\beta$ thresholds.

4. The process variable transmitter of claim 2 wherein the N-Hysteron model comprises a plurality of Hysterons each with a configurable weighting.

5. The process variable transmitter of claim 2 wherein the N-Hysteron model is configured using an $\alpha$-$\beta$ matrix.

6. The process variable transmitter of claim 1 wherein Hysteron basis functions are used to compensate for errors introduced in the sensed process variable due to hysteresis.

7. The process variable transmitter of claim 1 wherein Hysteron basis functions are used to compensate the sensed process variable through curve fitting.

8. The process variable transmitter of claim 1 wherein the process variable sensor comprises a pressure sensor.

9. The process variable transmitter of claim 8 wherein the pressure sensor includes a metal diaphragm.

10. The process variable transmitter of claim 9 wherein the metal diaphragm has a free-edge configuration.

11. The process variable transmitter of claim 9 wherein the metal diaphragm comprises a stretched membrane diaphragm.

12. The process variable transmitter of claim 1 wherein the process variable sensor comprises a temperature sensor.

13. The process variable transmitter of claim 1 wherein an output from the process variable sensor includes hysteresis introduced by components of the process variable sensor.

14. The process variable transmitter of claim 1 wherein an output from the process variable sensor includes hysteresis introduced from a source external to the process variable sensor.

15. The process variable transmitter of claim 14 wherein the source external to the process variable sensor comprises an isolation diaphragm.

16. The process variable transmitter of claim 14 wherein the source external to the process variable sensor comprises an isolation bellows.

17. The process variable transmitter of claim 1 wherein the initial values of the Hysteron basis functions are set to a mid-point value between the hysteresis loop extremes upon power up.

18. The process variable transmitter of claim 17 wherein the initial values are stored in a memory.

19. A method of compensating a process variable output from a process variable sensor in an industrial process, comprising:
   sensing a current process variable of the industrial process using the process variable sensor;
   compensating the sensed current process variable as a function of at least one previously sensed process variable characterized by Hysteron basis functions;
   providing an output related to the compensated sensed process variable; and
   setting each of the Hysteron basis functions to initial values that are between hysteresis loop extremes upon power up.

20. The method of claim 19 wherein the Hysteron basis functions are implemented in an N-Hysteron model, where N is the number of Hysterons.

21. The method of claim 20 wherein the N-Hysteron model comprises a plurality of Hysterons with configurable $\alpha$ and $\beta$ thresholds.

22. The method of claim 20 wherein the N-Hysteron model comprises a plurality of Hysterons each with a configurable weighting.

23. The method of claim 20 including configuring the N-Hysteron model using an $\alpha$-$\beta$ matrix.

24. The method of claim 19 wherein Hysteron basis functions are used to compensate for errors introduced in the sensed process variable due to hysteresis.

25. The method of claim 19 wherein Hysteron basis functions are used to compensate the sensed process variable through curve fitting.

26. The method of claim 19 wherein an output from the process variable sensor includes hysteresis introduced by components of the process variable sensor.

27. The method of claim 19 wherein an output from the process variable sensor includes hysteresis introduced from a source external to the process variable sensor.

28. The method of claim 19 wherein each of the initial values is a mid-point value between the hysteresis loop extremes.

29. The method of claim 28 including retrieving the initial values from a memory.

* * * * *